INVENTOR
D. M. CHAPIN
BY Lucian C. Canepa
ATTORNEY

United States Patent Office 3,417,210
Patented Dec. 17, 1968

3,417,210
CONDITION TESTING ARRANGEMENT
Daryl M. Chapin, Basking Ridge, N.J., assignor to Bell Telephone Laboratories, Incorporated, New York, N.Y., a corporation of New York
Filed Feb. 12, 1965, Ser. No. 432,112
16 Claims. (Cl. 179—175.3)

ABSTRACT OF THE DISCLOSURE

In an arrangement for selectively monitoring a condition at a plurality of locations along a transmission cable pair, a terminal station transmits a series of unidirectional pulses to establish lockup paths and thereby connect successive variable resistance condition-responsive transducers across the cable pair at the respective locations.

---

Figure 1:
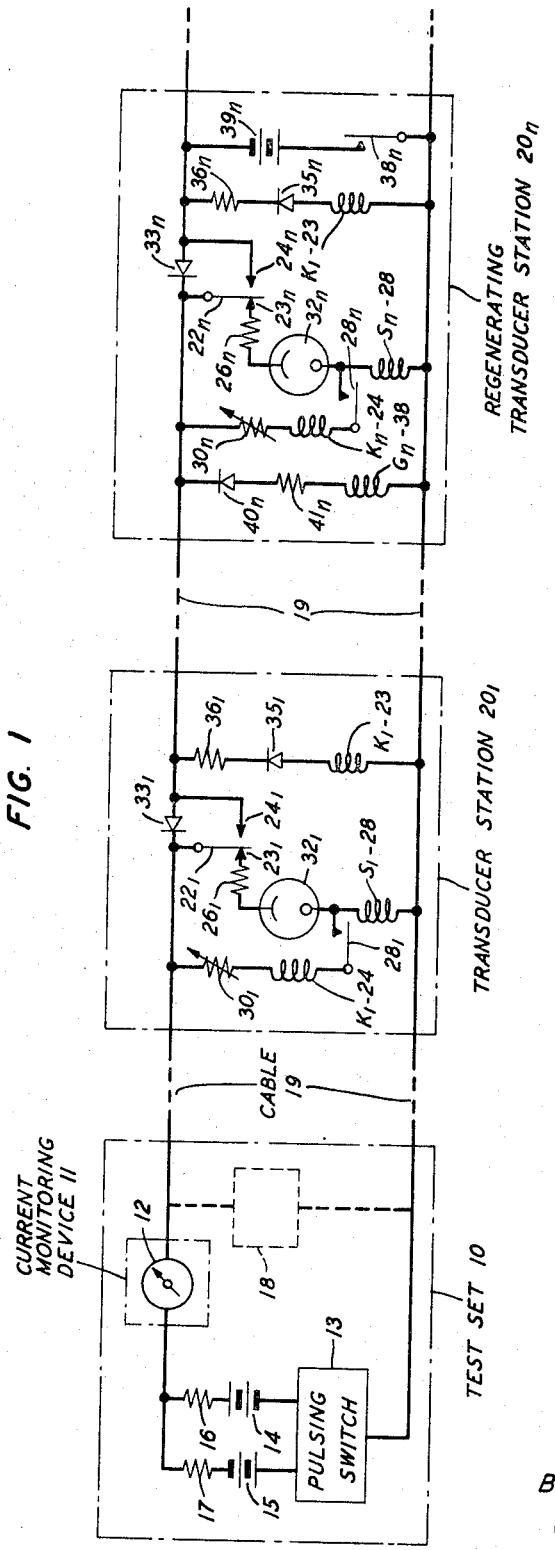

This invention relates to testing systems and, more specifically, to an arrangement for electronically measuring the pressure at each of a plurality of spaced locations in a pressurized communications cable or the like.

One of the most difficult and time consuming jobs in maintaining communications cables in a pressurized atmosphere, e.g., of gas or dry air, is that of securing reliable pressure readings at spaced points along the cable. The readings must be sufficiently accurate to permit gradient plotting techniques and the like to be used to detect and locate the position of a leak or low pressure area. On aerial cables, particularly, variations of temperature and barometric pressure encountered during the relatively long interval required for a technician to traverse rights of ways, climb poles, and the like, to obtain gradient data directly from each test position along the cable, results in information that frequently is inaccurate.

To avoid many of the problems involved in locating leaks by direct pressure measurements in the fields, it has become common practice to ascertain the approximate location of leaks via resistance measurements conducted at a central office. By placing a pressure sensitive contractor at each of a plurality of spaced intervals in a pressurized cable, it is possible to detect the presence and, to some extent, the location of a leak. Typically, the contactors are actuated when cable pressure falls below a preassigned level. These contactors shunt the connecting cable pair with a fixed, predetermined resistance. The line resistance is then correlated with typical impedance values therefor to identify the location of the leak. Although this technique eliminates, in large measure, the necessity for periodic field measurements, it nevertheless does not provide sufficient useful information for plotting accurate pressure gradients. Accordingly, locations cannot be accurately pinpointed.

Further, for economy, the contactors normally are connected across the same cable pair. Consequently, there is no simple way to ascertain if more than one contactor is closed, so that an inherent ambiguity in fault location exists.

Fully automatic gradient plotting may be achieved by placing a pressure-sensitive transducer at each of a number of specified cable locations and by periodically interrogating each transducer to ascertain the momentary pressure condition at each location. While this supplies sufficient data for gradient plotting, it ordinarily requires extensive apparatus at each test location along the cable system and elaborate terminal equipment. More importantly, however, it normally requires the employment of several cable pairs between the terminal station and each of the several remote transducer locations. In communications equipment, such as is embodied in a telephone pressure cable, it is of course undesirable to tie up transmission circuits for testing purposes.

It is therefore an object of the present invention to provide an improved cable pressure metering system.

More specifically, an object of the present invention is the provision of an economical cable pressure testing arrangement which does not substantially reduce the information-carrying capability of the monitored cable.

Still another object of the present invention is the provision of a cable pressure testing arrangement which may advantageously be relatively simple and inexpensively constructed, and which is highly reliable.

These and other objects of the present invention are realized in a specific, illustrative electronic testing system for measuring the gas pressure in a pressurized multiconductor telephone cable. The arrangement utilizes only a single cable pair, and includes a plurality of pressure-responsive, variable-resistance transducers physically located at spaced test points.

The transducers are sequentially connected across the cable pair via an associated lock-up relay and bistable transfer switch circuit combination. By energizing the variable resistors with a source of known potential and resistance, the resulting source current yields a direct measurement of the pressure characterizing the cable at the corresponding testing locations.

It is therefore a feature of the present invention that a gas pressurized cable testing arrangement include a cable pair, a plurality of physically separated, pressure-responsive transducers, a source of voltage pulses connected to the cable pair, and circuitry responsive to successive pulses impressed on the cable for sequentially connecting the transducers thereacross.

It is another feature of the present invention that a gas pressurized cable testing arrangement including a cable pair, a pressure-responsive variable-resistance transducer, a diode serially included in the cable pair, lockup relay circuitry including a normally open contact pair and a relay activating winding which is connected across the cable pair via first and second circuit paths, the second circuit path serially including the transducer and the relay contact pair, and a bistable transfer switch responsive to current flowing in the second circuit path for disabling the first circuit path and for short-circuiting the diode.

A complete understanding of the present invention and of the above and other features, advantages and variations thereof may be gained from a consideration of the following detailed description of an illustrative embodiment thereof presented hereinbelow in conjunction with the accompanying drawing, in which:

FIG. 1 is a diagram of a specific, illustrative cable pressure testing arrangement which embodies the principles of the present invention; and FIGS. 2A through 2D comprise a set of timing diagrams depicting the circuit operation characterizing selected system components illustrated in FIG. 1.

Referring now to FIG. 1, there is shown a specific, illustrative testing system for measuring pressures at a number of points within a cable system which extends from a local terminal location, or central office, to a remote station. The arrangement includes a test set 10 located at the central office, and a number of transducer stations 20 placed along the length of the cable at suitable intervals, and connected to the central office test set 10 by a single cable pair 19.

The test set 10 includes two oppositely poled voltage sources 14 and 15 which are selectively connected across the cable pair 19 via an associated series resistor 16 or 17 and a pulsing switch 13. The switch 13 is operative to repetitively connect the source 14 across the cable pair 19 once for each transducer station 20 associated therewith, thereby impressing a plurality of what are hereinafter deemed positive pulses on the cable 19. Following such signaling, the switch 13 is adapted to connect the voltage source 15 to the cable pair 19, hence supplying a resetting, negative energization thereto which completes a testing cycle of operation. In addition, the test set 10 includes a current responsive device 11, which may advantageously comprise an ammeter 12.

The transducer station $20_1$, which is generally illustrative of the stations 20, includes a variable pressure-responsive transducer $30_1$, which may embody any of the several types thereof commonly available. Such transducers generally include a diaphragm for selectively operating the slider arm of a potentiometer, or the like. The transducer $30_1$ is connected across the cable pair 19 through a bistable switch enabling winding $K_1$–24, a normally open contact pair $28_1$, and a relay enabling winding $S_1$–28.

A diode $33_1$ is serially included in the cable pair 19 at the transducer station $20_1$, with the cathode of the diode being connected via a transfer member $22_1$ and a contact terminal $23_1$ of a bistable switch, a resistor $26_1$, and a gas tube $32_1$ to the relay winding $S_1$–28. A second contact terminal $24_1$ is included in the bistable switch and connected to the anode of the diode $33_1$. Finally, the cable pair 19 has bridged thereacross at the station $20_1$ an additional series path comprising a second bistable switch enabling winding $K_1$–23, a diode $35_1$, and an associated resistor $36_1$. It is noted at this point, that the nominal impedance exhibited by the transducer $30_1$ is comparable in amplitude to that of the test set resistor 16, while being much smaller than the resistance value characterizing the element $26_1$.

The bistable switch common member $22_1$ is adapted to contact the switch terminals $23_1$ and $24_1$, respectively, when the switch enabling windings $K_1$–23 and $K_1$–24 have been last energized. When a current is not flowing in either of these windings, the switch transfer member $22_1$ retains its former state. Regarding the contact pair $28_1$, a connection is effected therethrough only when a current coincidentally flows through the relay winding $S_1$–28 associated therewith.

With the above-described circuitry in mind, a typical sequence of circuit operation for the FIG. 1 cable testing arrangement will now be described. Assume that the bistable switch common member 22 included in each of the transducer stations 20 is initially contacting the associated switch terminal 23, as shown for the transfer member $22_1$ in FIG. 2C prior to the time $b$ shown therein. At the time $a$ shown in FIG. 2A, let the pulsing switch 13 connect the positive voltage source 14 across the cable pair through the resistor 16. This positive potential appearing on the cable 19 is blocked by the diode $33_1$ from reaching any transducer station 20 beyond the station $20_1$.

The potential impressed across the cable pair 19 is conducted by the transfer switch members $22_1$ and $23_1$, the resistor $26_1$, and the relay winding $S_1$–28 to the gas tube $32_1$. After a relatively short interval, viz., between the times $a$ and $b$ shown in FIGS. 2A and 2B, the cable voltage renders the gas tube $32_1$ conductive. With the tube $32_1$ conducting, a current flows downward through the relay winding $S_1$–28 via the above-described series path, thereby closing the relay contact pair $28_1$, as shown in FIG. 2D for the interval following time $b$. Accordingly, a conduction path including the transducer $30_1$, the transfer switch winding $K_1$–24, the contact pair $28_1$ and the relay winding $S_1$–28 is completed across the cable 19. Hence, a current flows through the aforementioned series path with the relay contact pair $28_1$ being locked up therethrough.

The current which flows through the transfer switch enabling winding $K_1$–24 following time $b$ is operative to transfer the bistable switch common member $22_1$ from its initial contact with the terminal $23_1$, to a new position in contact with the terminal $24_1$. Accordingly, the voltage on the cable 19 is removed from the gas tube $32_1$ since the switch contact terminal $23_1$ is isolated, and conduction through the tube is extinguished.

Figure 2A:
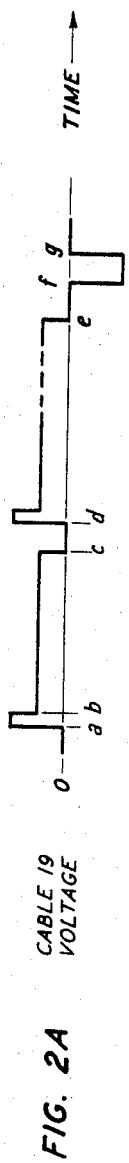
Figure 2B:
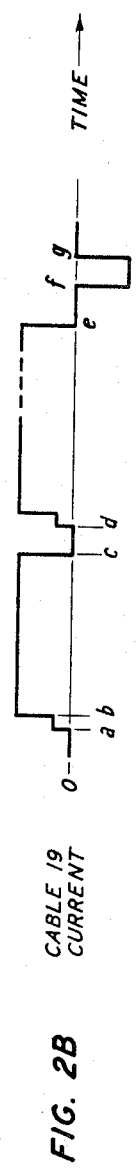
Figure 2C:
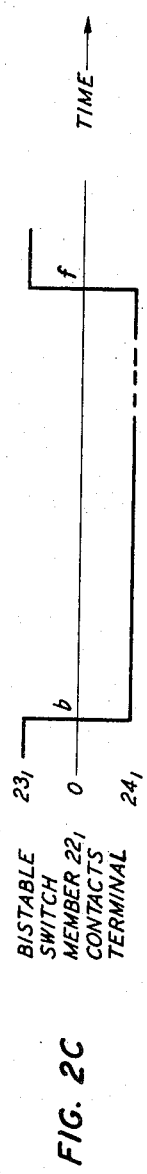
Figure 2D:
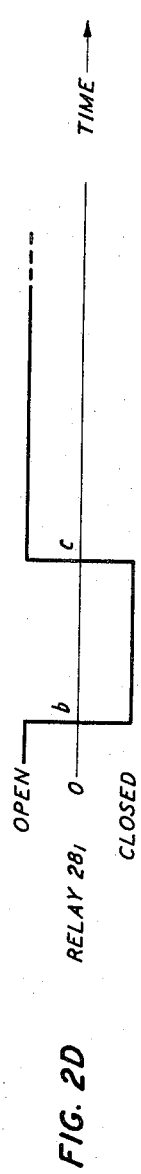

For the interval following the time $b$ shown in FIGS. 2A through 2D, the transducer $30_1$ is essentially connected across the cable 19. Since the transducer $30_1$ has an impedance comparable in magnitude to the resistance characterizing the resistor 16 associated with the positive voltage source 14, the potential across the cable 19 decreases due to voltage divider action, as seen in FIG. 2A. The decreased potential characterizing the cable 19 during this interval is adapted to be less than the threshold firing potential of the gas tubes 32. Accordingly, the tube 32 associated with the stage $20_2$ (not specifically shown in FIG. 1) following the presently interrogated stage $20_1$ will not fire, even though this tube is presently connected across the cable pair 19 via the stage $20_1$ transfer switch members $22_1$ and $24_1$ which short-circuit the negatively-poled diode $33_1$. Hence, only the transducer $30_1$ of the monitored station $20_1$, along with the windings $K_1$–24 and $S_1$–28 which have negligible resistances in comparison with the resistance exhibited by the element $30_1$, are effectively connected across the cable pair 19 following time $b$.

During the interval between the times $b$ and $c$ shown in FIG. 2B, the current which flows through the pressure monitoring device 11, i.e., the ammeter 12, is directly controlled by the resistance of the transducer $30_1$, and thereby also by the cable pressure existing at the transducer station $20_1$. Thus, the ammeter reading yields a direct measurement of the cable pressure obtaining at the station $20_1$.

At the time $c$ shown in FIG. 2A, the pulsing switch 13 disconnects the source 14 from the cable pair 19, thereby terminating current flowing through the relay enabling winding $S_1$–28. Accordingly, following the time $c$ shown in FIG. 2D, the relay contacts $28_1$ revert to their normally-open state. Thus, following the time $c$ shown in FIGS. 2A through 2D, the FIG. 1 arrangement resides in its initial state, except that the bistable switch members $22_1$ and $24_1$ short circuit the transducer station $20_1$ diode $33_1$, hence essentially connecting the next successive transducer station 20, viz., the station $20_2$, to the acble pair 19 for testing purposes. At the time $d$ shown in FIG. 2A, the switch 13 again causes a positive pulse to appear on the cable 19, which pulse fires the gas tube $32_2$ included in the aforementioned next transducer station $20_2$, hence initiating a pressure-reading cycle of operation at this station which is essentially identical to that described above for the station $20_1$.

The above-described mode of operation cyclically recurs responsive to each successive positive pulse impressed across the cable pair 19 until each of the transducer stations 20 has been sequentially interrogated. Following the completion of the last such pulse, the diode 33 included in each station 20 is short-circuited by the associated transfer switch, and the relay contacts 28 included therein reside in their normally open position.

To reset each of the transducer stations 20, the pulsing switch 13 next connects the negative source 15 across the cable pair 19, as shown for the time $f$ in FIG. 2A. The negative potential on the cable 19 gives rise to a current flowing upwards through the transfer switch winding K–23, the diode 35 and the resistor 36 included at each station 20, with the energized winding K–23 being operative to reset the associated bistable switch common member 22 to the contact terminal 23. The diode 33 at each station 20 insures a complete conduction path through the cable 19 for negative, resetting currents through all of the transducer stations 20, independent of the order in which the transfer switches at such stations are reset. Hence, following the removal of the negative potential from the cable 19 by the switch 13, i.e., following the time $g$ shown in FIG. 2A, the circuit resides in its initial state ready to initiate a new pressure testing cycle of operation.

Because of resistance losses inherently associated with the cable 19, there may be difficulty in resetting remote transducer stations 20 if the cable becomes very long. Accordingly, transducer stations of the type shown in detail in FIG. 1 for the station $20_n$ are periodically included along the cable 19. Such stations include a relay activating winding $G_n$–38 which is serially connected across the cable 19 by a diode $40_n$ and a current-limiting resistor $41_n$. In addition, a negatively poled voltage source $39_n$ is connected across the cable 19 by a normally open contact pair $38_n$ which is controlled by the winding $G_n$–38.

When a negative resetting current is impressed across the cable 19 by the pulsing switch 13 and the negative source 15, the energized winding $G_n$–38 is operative to close the contacts $38_n$, hence connecting the associated negative voltage source $39_n$ directly across the cable 19. Transducer stations more remote from the central office than the station $20_n$ are thus effectively reset by the full-valued negative potential supplied to the cable 19 by the source $39_n$.

Hence, the FIG. 1 arrangement has been shown by the above to electronically measure the pressure existing at selected transducer stations $20_n$ included in an arbitrarily long pressurized communications cable.

It is to be understood that the above-described arrangement is only illustrative of the application of the principles of the present invention. Numerous other arrangements may be devised by those skilled in the art without departing from the spirit and scope of this invention. For example, current-responsive recorders may be employed in the test set 10 in place of the ammeter 12, to automatically generate a plot of the pressure disposition characterizing the cable 19.

In addition, by reference to FIG. 2A, it is observed that the voltage across the cable 19 during station interrogation periods is proportional to the corresponding cable pressure at the remote testing point. Accordingly, a voltage metering element 18 connected in parallel with the cable 19 may replace the series-connected current-responsive device 11.

Moreover, the FIG. 1 arrangement may be employed to monitor environmental conditions besides cable pressures. For example, if the pressure-responsive transducers 30 are replaced by temperature-responsive thermistors, the cable temperature at the respective transducer stations 20 may advantageously be monitored.

What is claimed is:

1. In combination in a cable testing arrangement, a cable pair, a plurality of physically separated, condition-responsive transducers, a source of unidirectional pulses connected to said cable pair, and circuitry responsive to successive unidirectional pulses impressed on said cable pair by said source for sequentially connecting said transducers across said cable pair.

2. A combination as in claim 1 wherein said condition-responsive transducers comprise a plurality of pressure responsive, variable-resistance elements.

3. A combination as in claim 2, further including means for measuring impedance characterizing said cable pair.

4. A combination as in claim 3 wherein said impedance measuring means comprises means for measuring the current flowing in said cable pair when said source is impressing unidirectional pulses on said cable pair.

5. A combination as in claim 3 wherein said impedance measuring means comprises means for measuring the voltage across said cable pair.

6. A combination as in claim 4 wherein said source of unidirectional pulses comprises oppositely poled voltage sources, and transfer switching means selectively connected thereto.

7. A combination as in claim 6 further comprising two resistors respectively serially connected with said oppositely poled voltage sources.

8. In combination in a cable testing arrangement; a cable pair; a first conduction path connected across said cable pair including serially connected therein a first relay contact, a resistive element, and a lockup relay winding; and a second conduction path connected between said cable pair and including serially connected therein said lockup relay winding, a condition-responsive variable-resistance transducer, a normally open lockup relay contact responsive to said lockup relay winding, and a first relay winding, the energizing of said first relay winding opening said first relay contact.

9. A combination as in claim 8 further comprising a diode serially included in said cable pair.

10. A combination as in claim 9 wherein said first relay contact comprises a bistable relay contact responsive to current flowing in said first relay winding for disabling said first conduction path and for shortcircuiting said diode.

11. A combination as in claim 10 further comprising means for impressing transducer interrogating pulses on said cable pair, and means for monitoring the state of said cable pair during the duration of said interrogating pulses.

12. A combination as in claim 11 further comprising means for impressing unidirectional resetting pulses on said cable pair, and a transfer relay winding connected across said cable pair, said transfer relay winding being responsive to said unidirectional resetting pulses appearing on said cable for activating said bistable relay contact to enable said first conduction path.

13. A combination as in claim 8 wherein said resistive element comprises a gas tube.

14. A combination as in claim 13 further comprising a diode serially included in said cable pair.

15. A combination as in claim 14 wherein said first relay contact comprises a bistable relay contact responsive to current flowing in said first relay winding for disabling said first conduction path and for short-circuiting said diode.

16. A combination as in claim 8 further comprising an additional relay including a winding connected across said cable pair and a contact pair associated therewith, and a potential source selectively connected across said cable pair via said contact pair.

References Cited

UNITED STATES PATENTS 3,327,289   6/1967   Goldstine _____ 340—151

KATHLEEN H. CLAFFY, *Primary Examiner.*

A. McGILL, *Assistant Examiner.*

U.S. Cl. X.R.

317—140